(12) United States Patent
Ma et al.

(10) Patent No.: US 12,045,081 B2
(45) Date of Patent: Jul. 23, 2024

(54) SYNCHRONIZING, BY A BASEBOARD MANAGEMENT CONTROLLER, MASTER AND SUBORDINATE TIME PARAMETERS

(71) Applicant: Dell Products L.P., Round Rock, TX (US)

(72) Inventors: Xinzhi Ma, Shanghai (CN); Kongxian Nie, Shenzhen (CN)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 17/726,090

(22) Filed: Apr. 21, 2022

(65) Prior Publication Data

US 2023/0315144 A1 Oct. 5, 2023

(30) Foreign Application Priority Data

Apr. 2, 2022 (CN) .......................... 202210353077.1

(51) Int. Cl.
*G06F 1/12* (2006.01)
*G06F 1/14* (2006.01)

(52) U.S. Cl.
CPC . *G06F 1/12* (2013.01); *G06F 1/14* (2013.01)

(58) Field of Classification Search
CPC ..................................... G06F 1/12; G06F 1/14
See application file for complete search history.

(56) References Cited

U.S. PATENT DOCUMENTS

| 11,340,991 | B2 * | 5/2022 | Lambert | G06F 1/14 |
| 11,392,168 | B1 * | 7/2022 | Lambert | G06F 1/12 |
| 2018/0224884 | A1 * | 8/2018 | Oshima | G06F 11/0778 |

* cited by examiner

*Primary Examiner* — Nitin C Patel
(74) *Attorney, Agent, or Firm* — Jackson Walker L.L.P.

(57) ABSTRACT

A BMC-based time management system includes a host system and a baseboard management controller (BMC). The BMC implements a BMC time manager to perform time management and synchronization operations including receiving, from a time source, time information such as a timestamp corresponding to a particular time, e.g., year, month, day, hour, second, and milliseconds, sometimes referred to herein as an initial time. The BMC manager maintains, in accordance with the initial time, a BMC-determined time, referred to herein as the master time. The BMC time manager synchronizes one or more host system time values, also referred to herein as subordinate time values, in accordance with the master time. The one or more subordinate time parameters may include a host OS time, and one or more host device times. In this manner, the BMC maintains the master time and synchronizes host system time values.

20 Claims, 6 Drawing Sheets

SYNCHRONIZING, BY A BASEBOARD MANAGEMENT CONTROLLER, MASTER AND SUBORDINATE TIME PARAMETERS

This application claims priority, under 35 USC § 119(a), to China (CN) Application No. 202210353077.1, filed 2 Apr. 2022.

TECHNICAL FIELD

The present disclosure relates to information handling systems and, more specifically, the manner in which information handling systems maintain time information.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including at least some conventional server-class information handling systems, referred to herein as servers for the sake of brevity, support multiple independent sources of time information for the host system and various server subsystems. Time sources may include a real time clock (RTC), sometimes referred to as the hardware time source, a system time source sometimes referred to as the host OS time source, a device time source, and a baseboard management controller (BMC) time source, which may obtain an initial value from the RTC at system boot, but which may maintain its own clock source thereafter. Each independent time source may differ, to at least some observable degree, in the time that it reports at any given moment. This may result in differences in the timestamps used for various system logs and other time-aware functions and resources.

SUMMARY

In accordance with subject matter disclosed in the following description, a BMC-based time management system includes a host system and a baseboard management controller (BMC). The host system includes a central processing unit (CPU), a host memory coupled to the CPU, and one or more host devices including, as non-limiting examples, storage devices, network interface cards, graphics processing units (GPU), and the like. The BMC is communicatively coupled to the host system and includes a BMC processor and BMC storage coupled to the BMC processor. The BMC storage includes processor executable instructions, referred to herein as the BMC time manager, that, when executed, causes the BMC to perform time management operations. The time management operations performed by the BMC include, in at least some embodiments, receiving, from a time source, time information such as a timestamp corresponding to a particular time, e.g., year, month, day, hour, second, and milliseconds, sometimes referred to herein as an initial time. The BMC time manager maintains, in accordance with the initial time, a BMC-determined time, referred to herein as the master time. The BMC manager synchronizes one or more host system time values, also referred to herein as subordinate time values, in accordance with the master time. The one or more subordinate time parameters may include a host OS time and one or more host device times. In this manner, the BMC maintains the master time and synchronizes host system time values.

Disclosed embodiments of the BMC management support numerous options for receiving the initial time as described below. The initial time may be obtained from an RTC device, a network time resource such as an NTP server or a PTP-connected time source, a GPS-based device referred to herein as a time sync device, or from user input provided via a command line interface or graphical user interface.

As suggested previously, the disclosed system and methods address a problem in which server class systems lack a unified time synchronization mechanism and implement, instead, a number of time parameters including the RTC, system time or host OS time, one or more device times corresponding to one or more host devices and a time maintained by the BMC itself. Having more than one source of time for the various components of the information handling system can result in issues where logs generated from the host OS, one or more devices, and/or the BMC may use different timestamps, making it difficult to determine the sequence of various logged events. This, in turn, can cause issues for troubleshooting, particularly when it is necessary or useful to correlate multiple source logs.

Another problem addressed by described and disclosed systems and methods is the ability to accommodate a number of different timing precision requirements. For example, telecommunication customers may require high precision timing, for example 35 ppm RTC, and may therefore require a motherboard that includes an expensive RTC circuit while other customers may require only normal precision timing. In addition, in some instances, customers may elect to use a time synchronization network adapter for 5G applications, but the adapter is generally restricted by the supplier and network, resulting in a potentially more expensive solution. In addition, there is generally no mechanism to synchronize time with devices that work with auxiliary power when system power is off. Still further, there are security concerns associated with the use of network time sources that may be susceptible to hacker attached including NTP time sources, PTP time sources.

The issues referred to above are addressed by disclosed systems in which the BMC provides a single time synchronization source to manage the time on all server sub systems including the host OS, the BMC, individual devices, hypervisors, virtual machines, etc. By ensuring time consistency, disclosed systems and methods improve server operation and maintenance management efficiency. In addition, the scalability of the time management system is increased through the use of a BMC master timer. For example, a time synchronization service may be added on the BMC or the BMC may be used to connect to external time synchronization devices. The use of a dedicated out-of-band network for time synchronization also improves system security. The OS independence of disclosed time management resources and methods is also beneficial. The BMC-based time management features disclosed herein are adaptive and flexible to support different synchronization requirements.

In disclosed embodiments, the BMC manages and monitors the time information for all system resources and delivers time to system resources via one or more busses, transports, interconnects, protocols, or other forms of in-band or out-of-band transports. The specific transports used to deliver time information to the host OS and to host devices is an implementation choice and, although the implementations discussed in the following detailed description of the accompanying figures may expressly identify one or more particular transports, it will be appreciated by those of ordinary skill in the field that the identified transports are exemplary and that other implementations may employ alternative transports. For example, whenever a particular transport, such as an I2C bus or an IPMI protocol, is identified, it will be appreciated that other implementations may employ an alternative transports including, without limitation, I3C, NCSI, SPI, and PCIe-based in-band protocols such as MCTP over PCIe.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
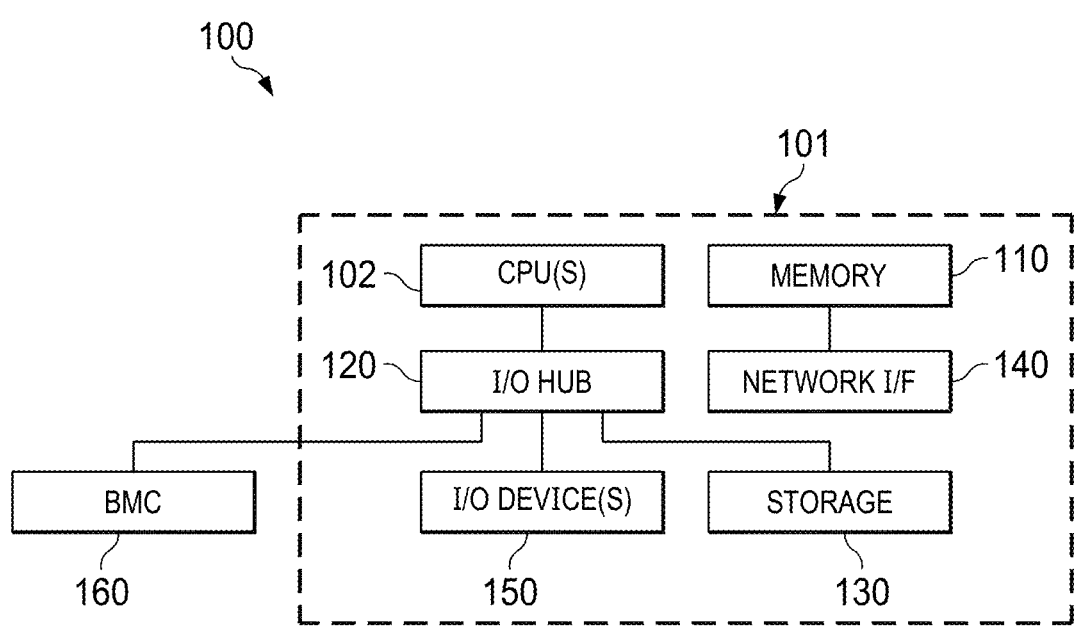
FIG. 1 illustrates an information handling system in accordance with disclosed teachings.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing. For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Before describing BMC-based time management features, specifically, an exemplary information handling system suitable for use in conjunction with disclosed features is described. Referring now to FIG. 1, any one or more of the elements illustrated in FIG. 2 through FIG. 7 may be implemented as or within an information handling system exemplified by the information handling system 100 illustrated in FIG. 1. The illustrated information handling system includes one or more general purpose processors or central processing units (CPUs) 102 communicatively coupled to a memory resource 110 and to an input/output hub 120 to which various I/O resources and/or components are communicatively coupled. The I/O resources explicitly depicted in FIG. 1 include a network interface card (NIC) 140, storage resources 130 including, as non-limiting examples a random array of inexpensive discs (RAID) host bus adapter (HBA) and/or a non-volatile memory express (NVMe) solid state drive (SSD), and additional I/O devices, components, or resources 150 including as non-limiting examples, keyboards, mice, displays, printers, speakers, microphones, etc. The illustrated information handling system 100 includes a baseboard management controller (BMC) 160 providing, among other features and services, an out-of-band management resource which may be coupled to a management server (not depicted). In at least some embodiments, BMC 160 may manage information handling system 100 even when information handling system 100 is powered off or powered to a standby state. BMC 160 may include a BMC processor, MBC memory, an out-of-band network interface separate from and physically isolated from an in-band network interface of information handling system 100, and/or other information handling resources. In certain embodiments, BMC 160 may include or may be an integral part of a remote access controller (e.g., a Dell Remote Access Controller or Integrated Dell Remote Access Controller) or a chassis management controller. In at least some embodiments, the illustrated components of information handling system 100, other than BMC 160, may be referred to as the host system 101.

Figure 2:
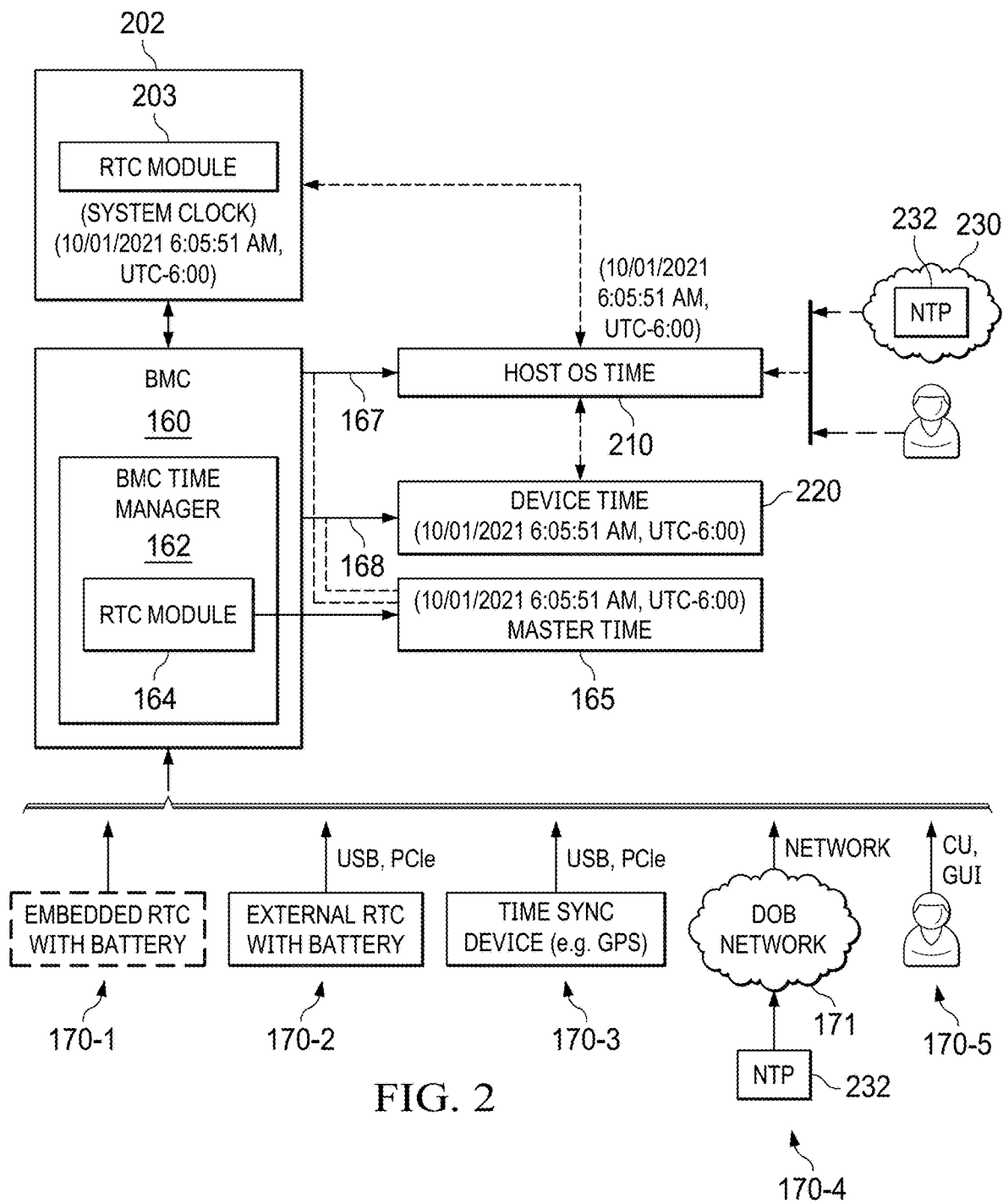
FIG. 2 illustrates elements of A BMC time manager disclosed hearing.

Turning now to FIG. 2, BMC-based time management features of an exemplary BMC 160 are illustrated in block diagram format. The illustrated BMC 160 includes a BMC time manager 162 and an optional RTC module 164. The BMC time manager 162 produces a master time 165 that is used to synchronize timing parameters associated with various host system resources including, in at least some embodiments, a host OS and one or more host system devices. These timing parameters may be referred to herein as subordinate time parameters to distinguish them from the master time 150 maintained by BMC 160.

As illustrated in FIG. 2, the master time 165 maintained by BMC time manager 162 may be use for synchronizing a host OS time 210 and a device time 220 corresponding to a host device (not explicitly depicted in FIG. 2). The device time 220 is representative of one of potentially numerous device times, each associated with a corresponding host system device, that may be maintained within the information handling system. In at least one embodiment, BMC time manager 162 maintains the host OS time 210 in synchronization with the master time 165 using management protocol commands such as intelligent platform management interface (IPMI) commands 167. In at least one embodiment, BMC time manager 162 maintains device time 220 in synchronization with master time 165 sending commands over a serial communication bus including, as one example, an I2C bus 168. Other embodiments may use alternative busses and/or protocols including, as non-limiting examples, MIPI I3C, NCSI, SPI, and PCIe-based in-band protocols such as MCTP over PCIe.

FIG. 2 further illustrates exemplary options for the source of time that BMC time manager 162 receives as the initial time. The illustrated source time options include a first time option in which an RTC with battery 170-1 is embedded within BMC 160, for example, affixed to the BMC printed circuit board (not explicitly depicted in FIG. 2). A second source time option is an external RTC with battery 170-2, which is illustrated communicating to BMC time manager 160 over a serial communication bus such as a universal serial bus (USB) or a peripheral components interconnect express (PCIe) bus. A third time source option illustrated in FIG. 2 is a time synchronization device 170-3 that may receive information such as global positioning system (GPS) information and process the GPS information to provide a source time to BMC time manager 162, again possibly using USB or PCIe. A fourth time source option 170-4 receives source time information from an NTP server 232 which provides information to BMC time manager 162 by way of an out of band network 171. Although an NTP server is illustrated in FIG. 2, other implementations may employ a PTP-connected time source or another suitable network time source. Finally, a fifth time source option 170-5 includes user input provided via a command line interface or a graphical user interface.

FIG. 2 further illustrates that, in at least some embodiments, BMC time manager 162 may receive source time information from an RTC module 203 within host system 101. The elements illustrated in FIG. 2 in dashed lines, including the host RTC module 203 and the embedded RTC with battery 170-1 are elements that may be omitted in some embodiments. FIG. 2 further illustrates that in some embodiments, source time information may originate from an NTP server 232 via an in band or business network 230 connected to a host system network adapter (not depicted in FIG. 2).

Figure 3:
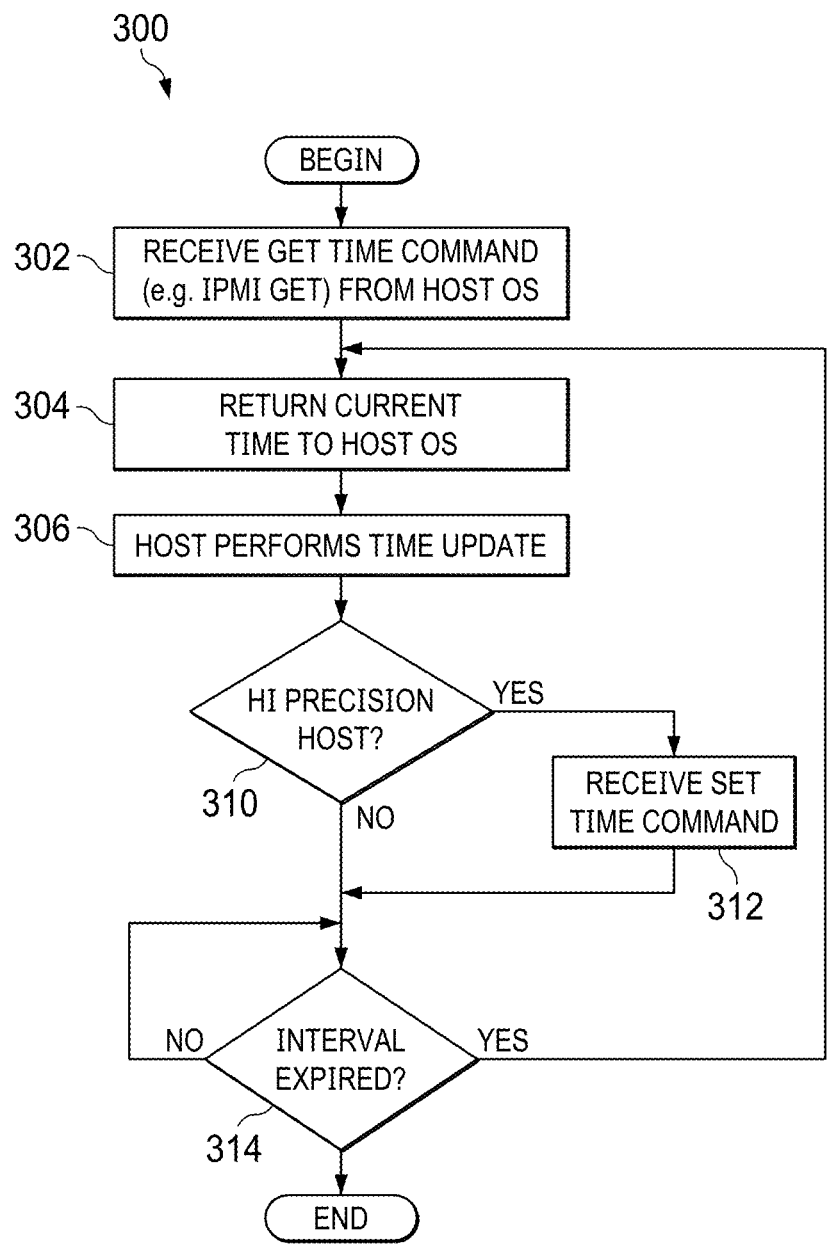
FIG. 3 is a flow diagram illustrating a BMC-based time management method.
Figure 4:
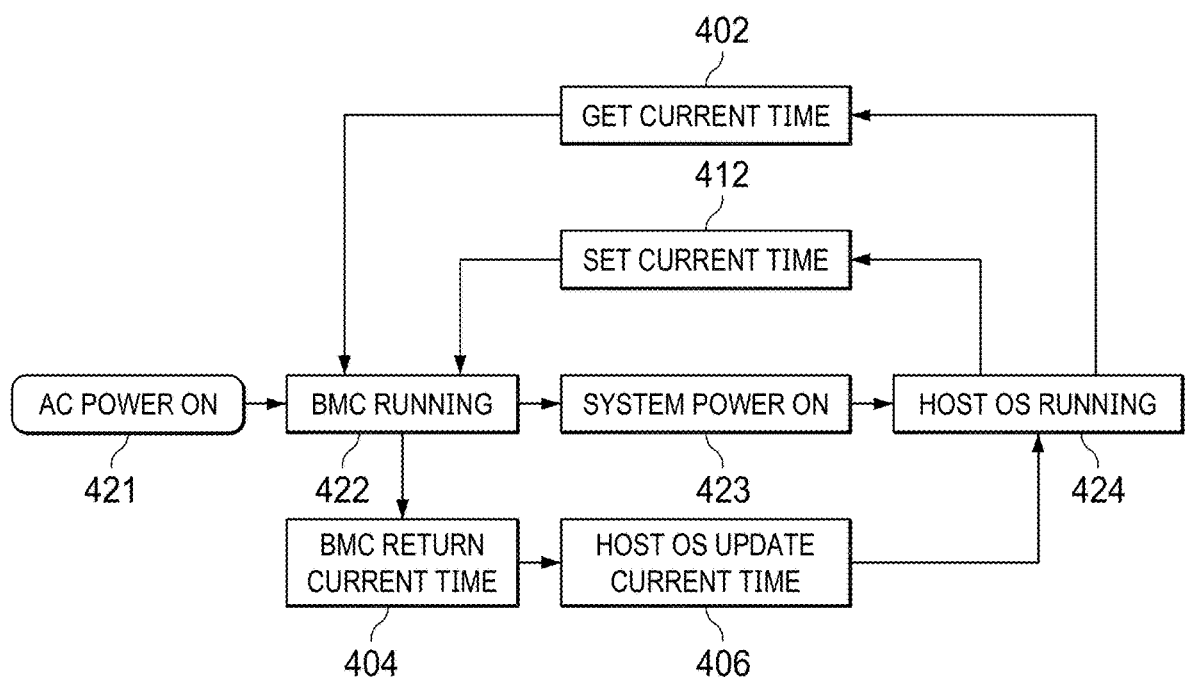
FIG. 4 is a graphical illustration of the method performed in FIG. 3.

Turning now to FIG. 3 and FIG. 4, a BMC-based time management method 300 is illustrated (FIG. 3) in flow diagram format and (FIG. 4) block diagram format. The illustrated time management method 300 includes receiving (FIG. 3 block 302) a GET TIME command from a host OS. FIG. 4 also depicts a power sequence which begins with the powering on of AC power in block 421, which when the BMC is up and running in block 422, triggers a system power on 423, that results in the host OS running in block 424.

FIG. 4 illustrates the running host OS 424 sending an IPMI get current time command 402 to the running BMC 422, but other embodiments may use a different management interface. The method 300 illustrated in FIG. 3 further includes returning a current time to the host OS in block 304. This method operation corresponds to the block 404 illustrated in FIG. 4. The host, upon receiving the current time from the BMC, may then perform a time update (block 306), which is illustrated in FIG. 4 with block 406. An exemplary Linux command for performing this functionality is shown below.

```
$ date-s "$(ipmitool sel time get)"
Tue Oct 19 11:25:17 CST 2021
```
The illustrated method 300 includes a determination in block 310 of whether the host includes a high precision RTC. If the host includes a high precision RTC, the illustrated method branches to block 312 where the BMC time manager receives (Block 312) a set time command from the host OS. this high precision RTC configuration is represented in FIG. 4 by block 412.

Figure 5:
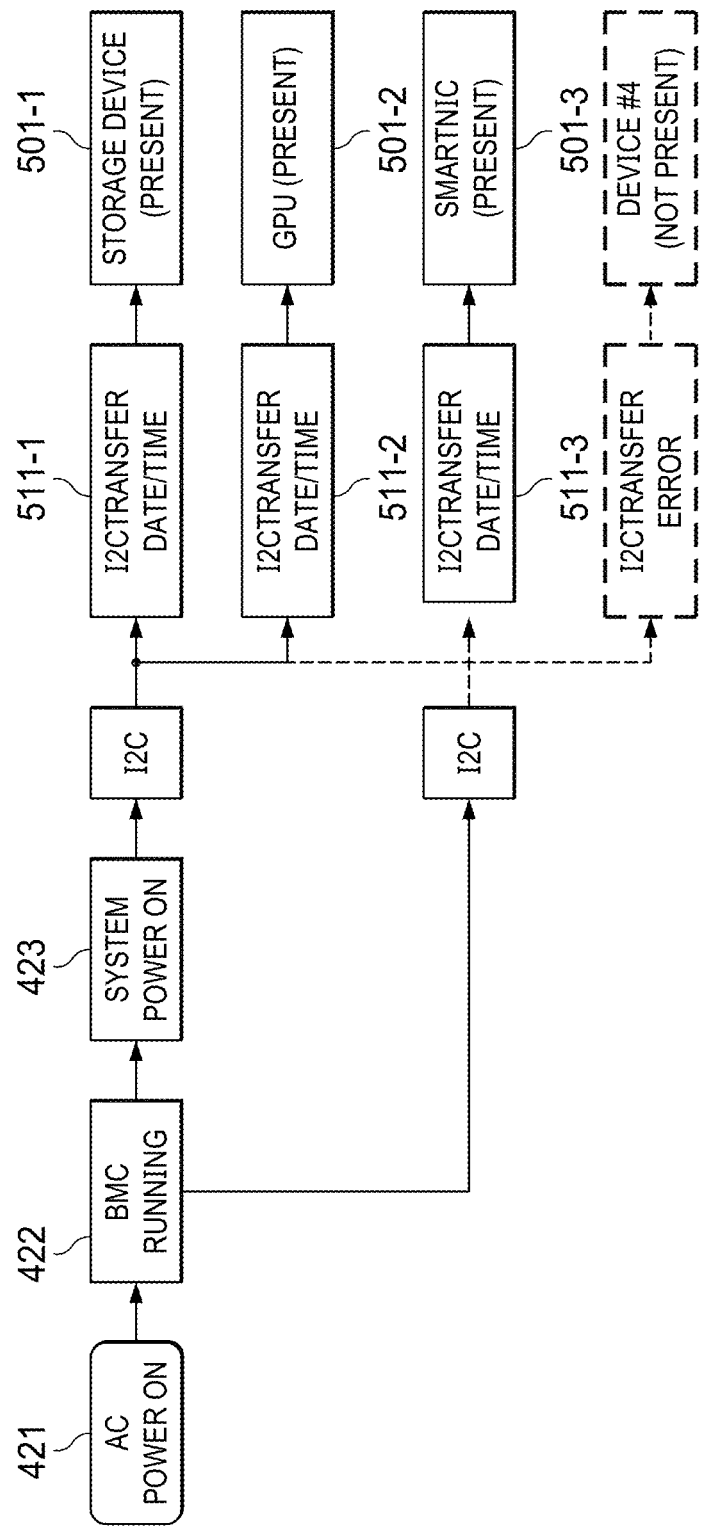
FIG. 5 illustrates BMC-based synchronization of various host device time parameters.

Turning now to FIG. 5, an illustration of BMC-based management of host devices is illustrated. FIG. 5 illustrates the same power sequence illustrated in FIG. 4 in which AC power comes on in block 421, Vik BMC is running in block 422, and system power comes on in block 423. In at least one embodiment, the features illustrated in FIG. 5 leverage in A-Z transfer tool that is available in the BMC operating system of at least some implementations, including, as a non-limiting example, a Dell remote access controller (IDRAC) from Dell Technologies. in such embodiments, the ITC transfer tool is enabled to read and write messages to and from manage devices over an eye to see bus. In at least some embodiment, the manage devices 501, of which three are illustrated in FIG. 5, include registers to expose current date/time and to accept new date/time settings via I2C. In at least some embodiments, the managed devices 501, of which three are illustrated in FIG. 5, include registers to expose current date/time and to accept new date/time settings via I2C transfers 511. When the BMC time manager detects managed devices available, it will synchronize date and time with them. Conversely, if the manage devices become not present, for example, hot removed, ITC transfers 511 will halt. In at least some embodiments, the BMC will perform date/time synchronizations at predefined intervals. In this manner, the internal date/time in all host devices is synchronized with the master time maintained by the BMC.

Figure 6:
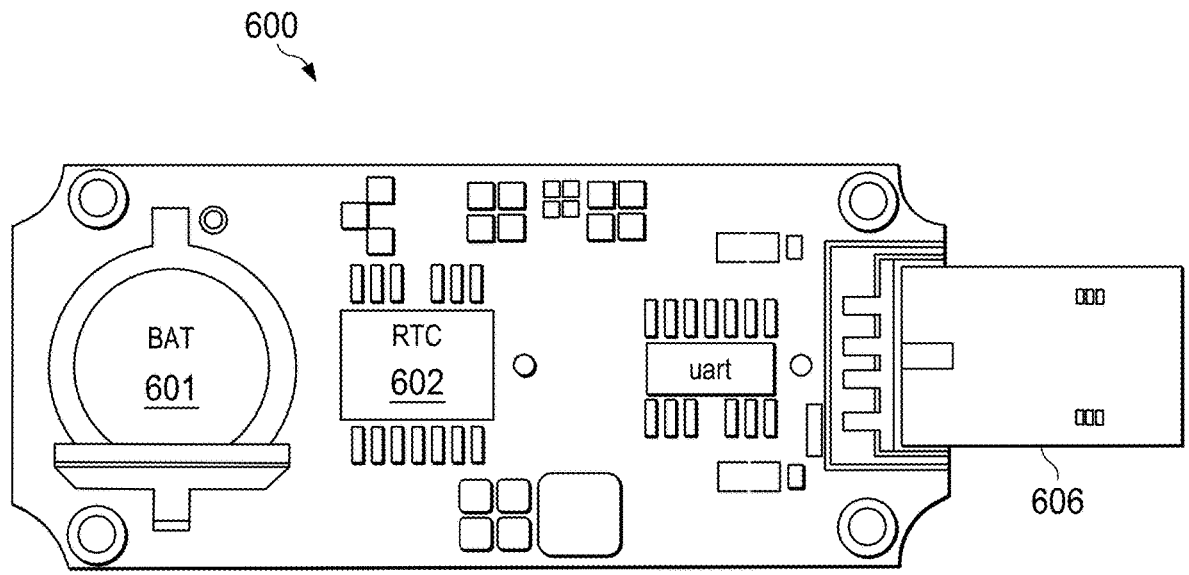
FIG. 6 illustrates an exemplary external RTC resource to support adaptive precision RTC solutions.

Turning now to FIG. 6, an adaptive precision RTC feature 600 is illustrated. The illustrated RTC module 600 is configured as an example of the external RTC with battery 170-2 illustrated in FIG. 1. The RTC module 600 illustrated in FIG. 6 includes a battery 601, an RTC device 602, a USB-to-I2C interface or UART, And a USB connector 166. To Implement the RTC module 600, module 600 is simply connected to the BMC via USB connection. RTC module 600 may be configured with RTC 602 feature different precisions. In this manner, an implementation that does not need a high precision and potentially costly RTC may employ a standard precision RTC 602 to improve the cost efficiency of the system. For high precision RTC customers, i.e., customer requiring high precision RTC, module 600 may be configured with a high precision RTC chip and inbuilt temperature compensation circuits. An exemplary application for a high precision embodiment of RTC module 600 may be some telecommunication industry applications, which may require 35 ppm RTC accuracy. As described in FIG. 1, the BMC maintains a master time and synchronizes time from RTC module 600 and provides this master time to the host OS and host devices.

Figure 7:
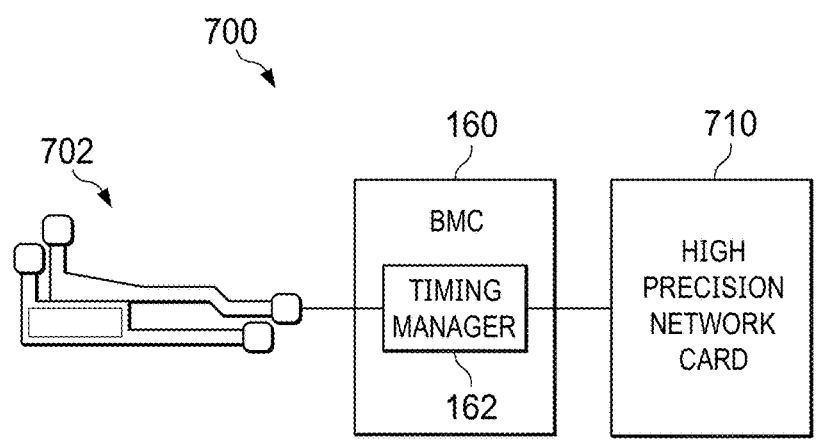
FIG. 7 illustrates an adaptive time synchronization solution.

Referring now to FIG. 7, an adaptive time sync module 700 is illustrated. The adaptive time sync module 700 includes an antenna 702 suitable for receiving 5G, Wi-Fi, or some other suitable radio signal. The antenna 702 is connected to BMC 160 and provides timing information to timing manager 162. Again the BMC 160 synchronizes time information from time sync devices such as GPS information and distribute this master time to server devices via ITC, as an example. Adaptive time sync module 700 enables real time data transmission with high timing accuracy at a low cost to 5G edge deployments such as Centralized Radio Access Network (CRAN) and Distributed RAN (DRAN) deployments. The illustrated module 700 enables customers to have a greater flexibility in the choice of network card 710. Substantially any suitable network card with high precision timing feature can be used in conjunction with the illustrated adaptive time sync module.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
  a host system including:
    a central processing unit (CPU);
    a host memory coupled to the CPU; and
    one or more host devices;
  a baseboard management controller (BMC), communicatively coupled to the host system, wherein the BMC includes a BMC time manager module configured to perform time management operations including:
    receiving timestamp data, indicative of an initial time, from a time source;
    maintaining, in accordance with the initial time, a master time parameter indicative of a current time;
    synchronizing one or more subordinate time parameters to the master time parameter, wherein the one or more subordinate time parameters include at least one time parameter selected from:
      a host operating system (OS) time parameter; and
      one or more host device time parameters maintained by one or more host devices.

2. The information handling system of claim 1, wherein the time source is selected from a group of time sources comprising:
  a real time clock (RTC);
  a network time protocol (NTP) resource configured to receive time information from an NTP server;
  a time synchronization device configured to receive global positioning system (GPS) data; and
  user input provided via a user interface.

3. The information handling system of claim 2, wherein the RTC is selected from:
an embedded RTC comprising an RTC device affixed to a BMC printed circuit board;
a host RTC; and
an external RTC module, comprising an RTC device coupled to the BMC via a serial communication bus selected from: a universal serial bus (USB) and a peripheral components interface express (PCIe) bus.

4. The information handling system of claim 3, wherein the RTC comprises an external RTC module and wherein the external RTC module is selected from:
a first external RTC module, wherein the first external RTC module includes a standard precision RTC; and
a second external RTC module, wherein the second external RTC module includes a standard precision RTC.

5. The information handling system of claim 2, wherein the NTP resource is configured to receive time information from an NTP server via an out of band network interface card (NIC) of the BMC.

6. The information handling system of claim 2, wherein the user interface is selected from a graphical user interface and a command line interface.

7. The information handling system of claim 2, wherein the time source comprises a combination of a plurality of time sources, wherein the plurality of time sources includes an NTP resource and an RTC.

8. The information handling system of claim 1, wherein synchronizing the one or more subordinate time parameters comprises:
synchronizing a host operating system time parameter wherein synchronizing the host operating system time parameter includes:
receiving, from the host system, a get time command;
returning, to the host system, the master time parameter; and
executing, by the host, a date command to update the host OS time parameter to the current time received from the BMC.

9. The information handling system of claim 8, wherein receiving the get time command comprises receiving an IPMI protocol get time command.

10. The information handling system of claim 2, wherein the one or more host device time parameters include at least one of:
a storage device parameter corresponding to a host storage device wherein the storage device comprises a storage device selected from:
a random, array of inexpensive discs (RAID) host bus adapter (HBA) card; and
a non-volatile memory express (NVMe) solid state drive (SSD); and
a smart network interface card (NIC) parameter corresponding to a smart NIC of the host.

11. A method, comprising:
receiving, by a baseboard management controller of an information handling system, timestamp data, indicative of an initial time, from a time source;
maintaining, in accordance with the initial time, a master time parameter indicative of a current time;
synchronizing one or more subordinate time parameters to the master time parameter, wherein the one or more subordinate time parameters include at least one time parameter selected from:
a host operating system (OS) time parameter associated with a host of the information handling system; and
one or more host device time parameters maintained by one or more host devices.

12. The method of claim 11, wherein the time source is selected from a group of time sources comprising:
a real time clock (RTC);
a network time protocol (NTP) resource configured to receive time information from an NTP server;
a time synchronization device configured to receive global positioning system (GPS) data; and
user input provided via a user interface.

13. The method of claim 12, wherein the RTC is selected from:
an embedded RTC comprising an RTC device affixed to a BMC printed circuit board;
a host RTC; and
an external RTC module, comprising an RTC device coupled to the BMC via a serial communication bus selected from: a universal serial bus (USB) and a peripheral components interface express (PCIe) bus.

14. The method of claim 13, wherein the RTC comprises an external RTC module and wherein the RTC external module is selected from:
a first external RTC module, wherein the first external RTC module includes a standard precision RTC; and
a second external RTC module, wherein the second external RTC module includes a standard precision RTC.

15. The method of claim 12, wherein the NTP resource is configured to receive time information from an NTP server via an out of band network interface card (NIC) of the BMC.

16. The method of claim 12, wherein the user interface is selected from a graphical user interface and a command line interface.

17. The method of claim 12, wherein the time source comprises a combination of a plurality of time sources, wherein the plurality of time sources includes an NTP resource and an RTC.

18. The method of claim 11, wherein synchronizing the one or more subordinate time parameters comprises:
synchronizing a host operating system time parameter wherein synchronizing the host operating system time parameter includes:
receiving, from the host system, a get time command;
returning, to the host system, the master time parameter; and
executing, by the host, a date command to update the host OS time parameter to the current time received from the BMC.

19. The method of claim 18, wherein receiving the get time command comprises receiving an IPMI protocol get time command.

20. The method of claim 12, wherein the one or more host device time parameters include at least one of:
a storage device parameter corresponding to a host storage device wherein the storage device comprises a storage device selected from:
a random array of inexpensive discs (RAID) host bus adapter (HBA) card; and
a non-volatile memory express (NVMe) solid state drive (SSD); and
a smart network interface card (NIC) parameter corresponding to a smart NIC of the host.

* * * * *